(12) United States Patent
Jung et al.

(10) Patent No.: US 9,936,412 B2
(45) Date of Patent: Apr. 3, 2018

(54) METHOD AND DEVICE FOR PERFORMING A LOGGED MEASUREMENT IN A WIRELESS COMMUNICATION SYSTEM

(71) Applicant: LG Electronics Inc., Seoul (KR)

(72) Inventors: Sung Hoon Jung, Gyeonggi-do (KR); Seung June Yi, Gyeonggi-do (KR); Young Dae Lee, Gyeonggi-do (KR); Sung Duck Chun, Gyeonggi-do (KR); Sung Jun Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 132 days.

(21) Appl. No.: 14/919,862

(22) Filed: Oct. 22, 2015

(65) Prior Publication Data

US 2016/0112893 A1 Apr. 21, 2016

Related U.S. Application Data

(63) Continuation of application No. 13/878,457, filed as application No. PCT/KR2011/007463 on Oct. 10, 2011, now Pat. No. 9,185,580.

(60) Provisional application No. 61/391,664, filed on Oct. 10, 2010.

(51) Int. Cl.
*H04L 12/26* (2006.01)
*H04W 24/10* (2009.01)
*H04W 24/02* (2009.01)

(52) U.S. Cl.
CPC ........... *H04W 24/10* (2013.01); *H04W 24/02* (2013.01)

(58) Field of Classification Search
None
See application file for complete search history.

(56) References Cited

U.S. PATENT DOCUMENTS

| 8,340,659 | B2 * | 12/2012 | Yi | H04W 24/08 |
| | | | | 455/414.1 |
| 9,185,580 | B2 * | 11/2015 | Jung | H04W 24/10 |
| 9,220,029 | B2 * | 12/2015 | Wu | H04W 60/06 |
| 2008/0077263 | A1 | 3/2008 | Yamane et al. | |
| 2011/0183662 | A1 | 7/2011 | Lee et al. | |
| 2011/0201279 | A1 * | 8/2011 | Suzuki | H04W 24/10 |
| | | | | 455/67.11 |
| 2011/0286356 | A1 | 11/2011 | Tenny et al. | |

(Continued)

FOREIGN PATENT DOCUMENTS

EP 2608596 A1 6/2013

OTHER PUBLICATIONS

3GPP TSG RAN WG2 Meeting #70 R2-103191 (www.3gpp.org), May 14, 2010.

(Continued)

*Primary Examiner* — Michael J Moore, Jr.
(74) *Attorney, Agent, or Firm* — Morgan, Lewis & Bockius LLP

(57) ABSTRACT

A method for performing a logged measurement in wireless communication system is provided. The method includes receiving measurement configuration from a network, logging MDT (Minimization of Driving Tests) measurement, detecting whether a condition for state transition has occurred, performing state transition when the condition for state transition has occurred, and logging state transition information related to said state transition.

18 Claims, 14 Drawing Sheets

(56) References Cited

U.S. PATENT DOCUMENTS

| | | | |
|---|---|---|---|
| 2011/0306345 A1* | 12/2011 | Wu | H04W 24/10 455/436 |
| 2012/0009918 A1* | 1/2012 | Wu | H04W 24/10 455/423 |
| 2012/0044822 A1 | 2/2012 | Kim et al. | |
| 2012/0069760 A1* | 3/2012 | Wu | H04L 41/0813 370/252 |
| 2012/0082051 A1 | 4/2012 | Kim et al. | |
| 2012/0088457 A1* | 4/2012 | Johansson | H04W 24/10 455/67.11 |
| 2012/0275366 A1 | 11/2012 | Anderson et al. | |
| 2013/0095860 A1 | 4/2013 | Hapsari et al. | |
| 2013/0178216 A1 | 7/2013 | Chang et al. | |
| 2013/0183978 A1* | 7/2013 | Keskitalo | H04W 24/10 455/436 |
| 2013/0190031 A1* | 7/2013 | Persson | H04W 24/08 455/517 |
| 2013/0196650 A1 | 8/2013 | Futaki | |
| 2014/0045493 A1 | 2/2014 | Hapsari et al. | |
| 2014/0317456 A1 | 10/2014 | Kim et al. | |
| 2017/0134980 A1* | 5/2017 | Persson | H04W 24/10 |

OTHER PUBLICATIONS

3GPP TSG RAN WG2 Meeting #48 RP-100457 (www.3gpp.org), Jun. 4, 2010.

3GPP TSG RAN2 #69bis R2-102453 (www.3gpp.org), Apr. 16, 2010.

3GPP TSG RAN WG2 Meeting #75 R2-113818 (www.3gpp.org), Aug. 22, 2011.

International Search Report issued in corresponding International Patent Application No. PCT/KR2011/007463 dated Apr. 9, 2012.

Office Action issued in counterpart Great Britain Patent Application No. 1306692.3 dated Jun. 20, 2014.

XP050540165 3 GPP TSG RAN WG2 Meeting #75 R2-113818 (www.3gpp.org) Aug. 22, 2011.

* cited by examiner

METHOD AND DEVICE FOR PERFORMING A LOGGED MEASUREMENT IN A WIRELESS COMMUNICATION SYSTEM

CROSS REFERENCE TO RELATED APPLICATIONS

The present application is a continuation of U.S. patent application Ser. No. 13/878,457, filed on Apr. 9, 2013, the entire disclosure of which is hereby incorporated by reference for all purposes as if fully set forth herein. U.S. patent application Ser. No. 13/878,457 is a U.S. National Stage Entry of PCT International Application No. PCT/KR2011/007463, filed on Oct. 10, 2011, and claims the benefit of U.S. Provisional Application No. 61/391,664, filed on Oct. 10, 2010.

TECHNICAL FIELD

The present invention relates to a wireless communication and, more specifically, to a method for performing logged measurement in a wireless communication system and the device supporting thereof.

BACKGROUND ART

3GPP (3rd Generation Partnership Project) LTE (long term evolution), which is an improvement of UMTS (Universal Mobile Telecommunications System), has been introduced as 3GPP release 8. 3GPP LTE uses OFDMA (orthogonal frequency division multiple access) in downlink, and SC-FDMA (Single Carrier-frequency division multiple access) in uplink. MIMO (multiple input multiple output) having maximum of 4 antennas has been adopted. Recently, discussions on 3GPP LTE-A (LTE-Advanced), the evolved 3GPP LTE, have been developing.

MDT (Minimization of Driving Tests) measurement is a method of test using terminals instead of vehicles which operators use for coverage optimization. The coverage varies depending on the location of the base station, arrangements of buildings around the test area and the environment of use of users. Therefore, the operator needs to perform driving tests periodically, requiring lots cost and resources. MDT enables the operator to measure the coverage by using a terminal.

MDT can be divided into logged MDT and immediate MDT. In logged MDT, the terminal performs MDT measurement and transfers the logged measurement to network at certain point of time. In immediate MDT, the terminal performs MDT measurement and transfers the measurement to network when reporting condition is fulfilled. Logged MDT performs MDT measurement in RRC idle mode while immediate MDT performs MDT measurement in RRC connection mode.

The operator can collect MDT measurements received from various terminals and produce a coverage map representing the distribution of availability of service and quality of services over the area the operator provides service for utilizing in network management and optimization. For example, when a problem of coverage in a certain area is reported from a terminal, the operator can extend the cell coverage of corresponding area by increasing transmit power of the base station providing service to the area.

In logged measurement, logging is carried out by the terminal and the logging of the results of measurement can be suspended or limited for various reasons. The terminal maintains the configuration for logging even when the logging is suspended. When the situation of suspension of the logging of the terminal is suspended is resolved, the terminal resumes logging according to the configuration maintained. When the logging is resumed after suspension, the results of the logging are not continuous in time. If the received logging results contain empty parts, the network can't identify the wireless environment and performance index for the empty parts. Therefore, there need a method for logging considering the situation where logging is suspended and/or resumed, and the device supporting the method.

DISCLOSURE

Technical Problem

The present invention aims to provide a method for performing logged measurement in a wireless communication system and the device supporting thereof.

Technical Solution

In an aspect, a method for performing a logged measurement in wireless communication system is provided. The method includes receiving measurement configuration from a network, logging MDT (Minimization of Driving Tests) measurement, detecting whether a condition for state transition has occurred, performing state transition when the condition for state transition has occurred, and logging state transition information related to said state transition.

The step of performing state transition may include transiting to the state of suspending logging when the condition occurred for state transition is a condition for suspending logging.

The state transition information may include an indicator indicating that state transition has been made to the state of suspending logging.

The state transition information may further include the condition for suspending logging.

The state transition information may further include the time that the terminal performed state transition.

The condition for suspending logging may include at least one of: leaving of the UE from the RRC (radio resource control) state which is configured to perform logging, leaving of the UE from the RAT (Radio Access Technology) which is configured to perform logging, leaving of the UE from logging area, leaving of the UE from logging PLMN (Public Land Mobile Network), leaving of the EU from the state of normal camping, and whether total sum of the contents of the log including the logged MDT measurement and the state transition information reaches a predetermined value.

The state transition may include state transition of the UE to the state in which logging is available, and logging of MDT measurement by the UE, when the condition for state transition occurred is a condition for resuming logging.

The state transition information may include an indicator indicating that state transition has been made to the state in which logging is available.

The state transition information may further include the condition for resuming logging.

The state transition information may further include the time that the terminal has performed state transition.

The condition for resuming logging may include at least one of: entering of the UE to RRC (radio resource control) which is configured to perform logging, entering of the UE to RAT which is configured to perform logging, entering of the UE to logging area, entering of the UE to logging PLMN, and entering of the UE to the state of normal camping.

The UE may be configured to periodically perform logging of the MDT measurement.

The UE may be configured to perform logging based on the generation of events.

The method may further include receiving request for reporting log contents from said network, and transferring in response to the request for reporting, log contents including the logged MDT measurement and the state transition information to the network.

In another aspect, a device for performing logged measurement in wireless communication system is provided. The device includes a RF (Radio Frequency) unit for receiving and transmitting radio signal; and a processor connected to the RF unit. The processor is configured to receive measurement configuration from a network, log MDT measurement, detect occurrence of a condition for state transition, transit the state when the condition for state transition occurs, and perform logging state transition information related to the state transition.

Advantageous Effects

According to one embodiment of the present invention, the terminal detects the condition of logging state transition and, when the condition occurs, transits the logging state. Upon carrying out the logging state transition, the state transition information is logged along with MDT measurement. Through this procedure, the network can construct more precise network throughput information such as a coverage map by referencing the information regarding the suspension or resumption of logging contained in the log.

MODE FOR INVENTION

Figure 1:
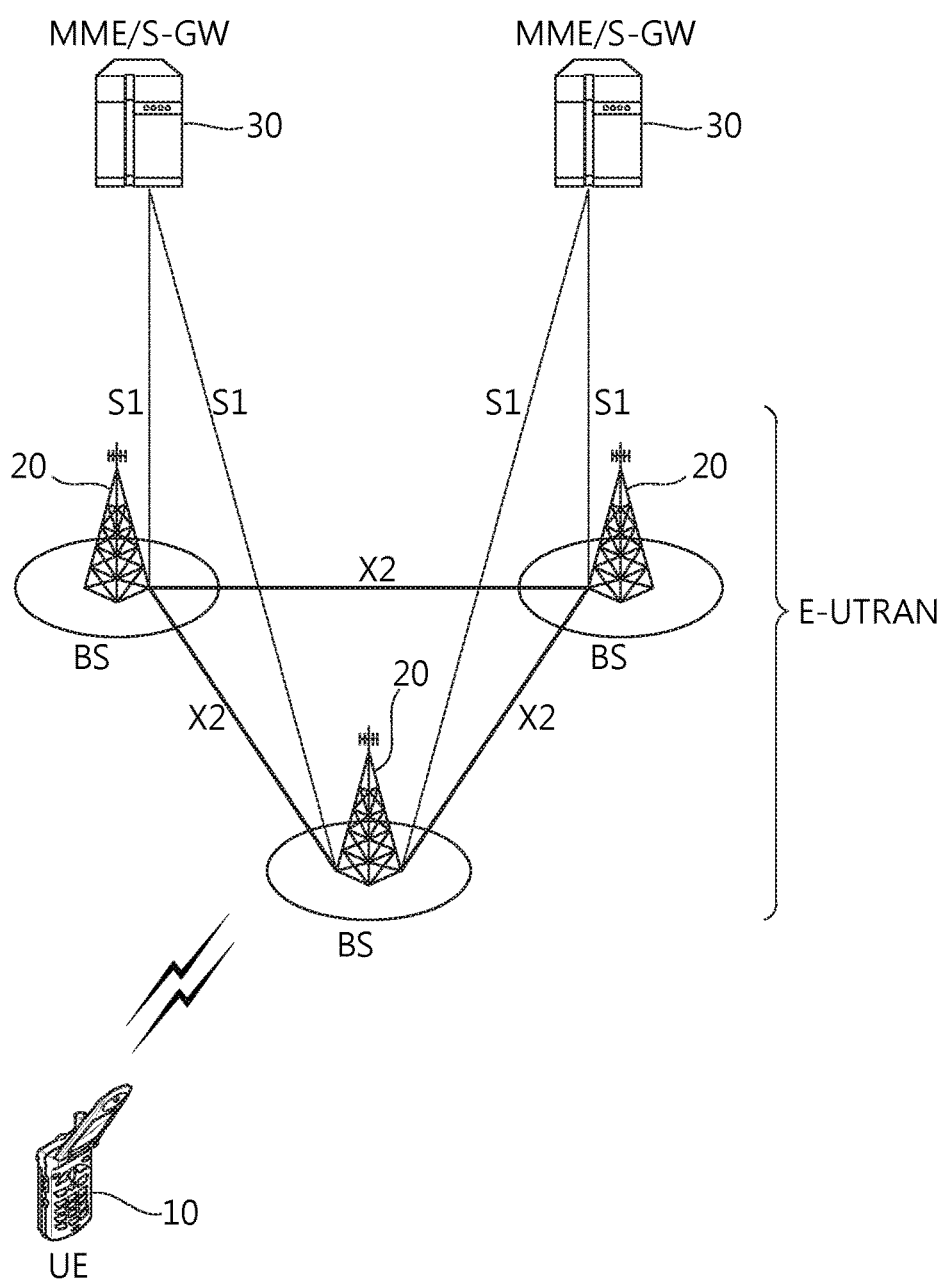
FIG. 1 shows the wireless communication system to which the present invention is applied.

FIG. 1 shows the wireless communication system to which the present invention is applied. The system can be referred to as E-UTRAN (Evolved-UMTS Terrestrial Radio Access Network), or LTE (Long Term Evolution)/LTE-A system.

E-UTRAN includes a base station (BS) 20 providing the terminal (User Equipment, UE) 10 with control plane and user plane. The UE 10 can be fixed or have mobility, and referred to as other names such as MS (Mobile station), UT (User Terminal), SS (Subscriber Station), MT (mobile terminal) or wireless device. The base station 20 means a fixed station communicating with the UE 10, and can be referred to as other names such as eNB (evolved-NodeB), BTS (Base Transceiver System) or access point.

The base stations 20 can be connected through $X_2$ interface. The base station 20 is connected to EPC (Evolved Packet Core, 30) through S1 interface, or more specifically through S1-MME via MME (Mobility Management Entity) and S1-U to S-GW (Serving Gateway).

EPC 30 comprises MME, S-GW and P-GW (Packet Data Network-Gateway). MME has information on the connection of the UE or the information on the capacity of the UE, which is used for managing mobility of the UE. S-GW is a gateway having E-UTRAN as a terminal point, and P-GW a gateway having PDN as a terminal point.

The layers of Radio Interface Protocol between the UE and the network can be divided into L1 (1st layer), L2 (2nd layer) and L3 (3rd layer) based on 3 sub-layers of open system interconnection (OSI) reference model which is well-known in communication systems, among which the physical layer belonging to the 1st layer provides information transfer service using Physical Channel and the RRC (Radio Resource Control) layer located at the 3rd layer performs control of radio resources between the UE and network. For this operation, the RRC layer exchanges RRC messages between the UE and base station.

Figure 2:
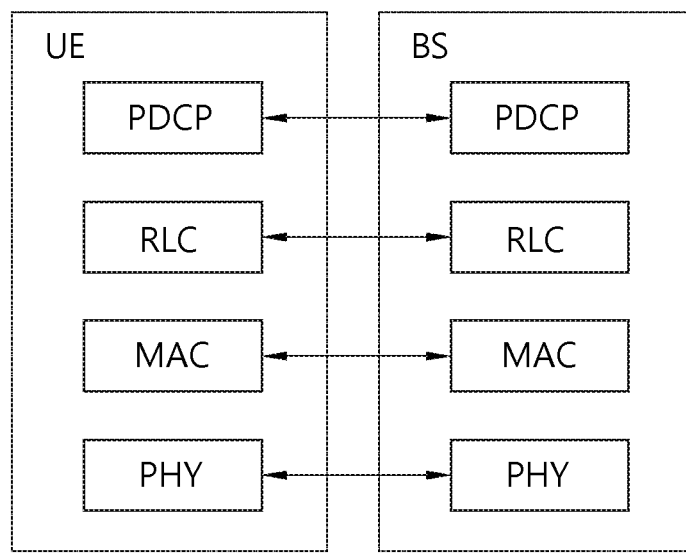
FIG. 2 is a block diagram illustrating the radio protocol architecture on the user plane.
Figure 3:
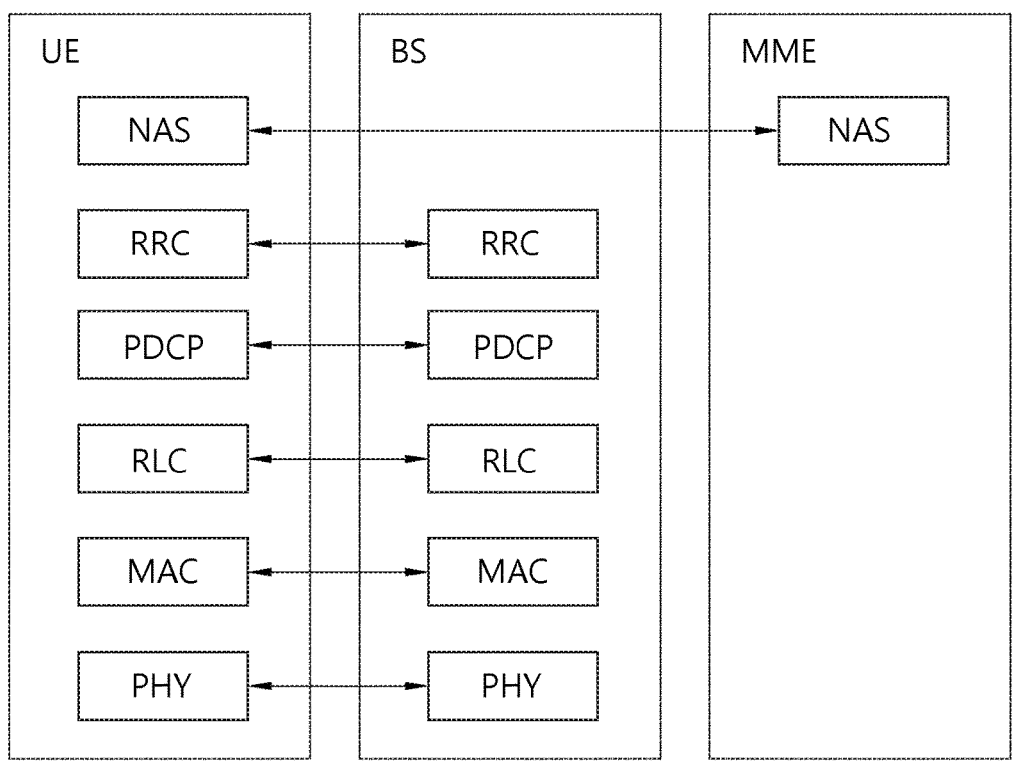
FIG. 3 is a block diagram illustrating the radio protocol architecture on control plane.

FIG. 2 is a block diagram illustrating the radio protocol architecture on the user plane. FIG. 3 is a block diagram illustrating the radio protocol architecture on control plane. The data plane is a protocol stack for user data transfer and the control plane is a protocol stack for control signal transfer.

Referring to FIGS. 2-3, the physical layer (PHY) provides upper-layer with information transfer service by using the physical channel. The physical layer is connected through transport channel unlike MAC (Medium Access Control) layer, the upper-layer. Data is transferred through transport channel between MAC layer and physical layer. The transport channels are classified according to how data is transferred with characteristics through radio interface.

Data is transferred between different physical layers, in other words, data is transferred through physical channel between the physical layers of the transmitter and receiver. The physical channel can be modulated by OFDM (Orthogonal Frequency Division Multiplexing) method, and time and frequencies are used as wireless resources.

The functions of MAC layer include mapping between the logical channel and transport channel, and multiplexing/inverse-multiplexing to the transport block provided via physical channel onto the transport channel of MAC SDU (service data unit) belonging to the logical channel. MAC layer provides service to RLC (Radio Link Control) layer through logical channel.

Functions of RLC layer include concatenation, segmentation and reassembly of RLC SDUs. In order to ensure various QoS (Quality of Service) required by Radio Bearer (RB), the RLC layer provides three operation mode of transparent mode (TM), Unacknowledged Mode (UM) and Acknowledged Mode (AM). AM RLC provides error correction through ARQ (automatic repeat request).

Functions of PDCP (Packet Data Convergence Protocol) layer on user plane include transfer of user data, header compression and ciphering. Functions of PDCP (Packet Data Convergence Protocol) layer on user plane include transfer of control plane data and ciphering/integrity protection.

RRC (Radio Resource Control) layer is only defined on control plane. RRC layer performs the task of configuration of radio bearers, re-configuration and control of logical channel, transport channel and physical channel in relation to release. RB means a logical path which is provided by the 1st layer (PHY layer) and 2nd layer (MAC layer, RLC layer and PDCP layer) to transfer data between the UE and network.

The process of configuring RB means that characteristics of radio protocol layer and channel are specified for providing specific service and specific parameters and operation methods are configured for each service. RB is then divided into two types of SRB (Signaling RB) and DRB (Data RB). SRB is used as a passage for transferring RRC message on the control plane, and DRB is used as a passage for transferring user data on the user plane.

When RRC connection (RRC Connection) is established between the RRC layer of the UE and RRC layer of E-UTRAN, the UE can be in RRC connected state, or otherwise in RRC idle state.

As for downlink transport channels, which transfer data from network to the UE, there is BCH (Broadcast Channel) which transfers system information, and downlink SCH (Shared Channel) which transfers other information such as user traffic or control message. In the case of traffic or control message of downlink multicast or broadcast service, transfer can be performed through downlink SCH or through separate downlink MCH (Multicast Channel). Meanwhile, as for uplink transport channels, which transfer data from the UE to network, there are RACH (Random Access Channel) which transfers initial control message, and uplink SCH (Shared Channel) which transfers other information such as user traffic or control message.

As for logical channels, which is above the transport channel and are mapped to the transport channel, there are BCCH (Broadcast Control Channel), PCCH (Paging Control Channel), CCCH (Common Control Channel), MCCH (Multicast Control Channel), MTCH (Multicast Traffic Channel), etc.

The physical channel consists of multiple OFDM symbols in time domain and multiple sub-carrier in frequency domain. A sub-frame consists of multiple OFDM Symbols in time domain. The resource block is a unit of resource allocation and consists of multiple OFDM symbols and multiple sub-carriers. Also, each sub-frame can use specific sub-carriers of specific OFDM symbols (e.g., the 1st OFDM symbol) of corresponding sub-frame for PDCCH (Physical Downlink Control Channel) i.e. for L1/L2 control channel. TTI (Transmission Time Interval) is a unit time for sub-frame transfer.

The RRC state of the UE and the method of RRC connection will be described below.

RRC state means whether the RRC layer of the UE is logically connected with the RRC layer of E-UTRAN or not, and is called to be in RRC connection state when connection is established, or in RRC IDLE STATE when connection is not established. The UE in RRC connection state can be identified by E-UTRAN since there exists RRC connection, and therefore effective control of the UE is possible. On the other hand, the UE in RRC IDLE STATE cannot be identified by E-UTRAN, and is controlled by CN (core network) in the unit of Tracking Area which is larger unit of area than the cell. In other words, the UE in RRC IDLE STATE is only identified in the unit of large area and so should transit to RRC connection state to receive conventional mobile communication service such as voice and data.

When a user first turns the UE on, the UE first searches appropriate cell and stays in corresponding cell in RRC IDLE STATE. The UE in RRC IDLE STATE establishes RRC connection with E-UTRAN through RRC connection procedure when there needs RRC connection, and transit to RRC connection state. The UE in RRC IDLE STATE needs RRC connection for various reasons such as the need for uplink data transfer to try to call by the user or, when paging message is received from E-UTRAN, transfer of response message.

NAS (Non-Access Stratum) layer, which is above RRC layer, performs the function such as session management and mobility management.

Two states, EMM-REGISTERED (EPS Mobility Management-REGISTERED) and EMM-DEREGISTERED are defined to manage the mobility of UE in NAS layer, and two states are applied to the UE and MME. Initially, the UE is in EMM-DEREGISTERED state, and the UE performs the process of registering to corresponding network through the process of Initial Attach to access to the network. If the Attach process is successfully performed, the UE and MME are in EMM-REGISTERED state.

In order to manage signaling connection between the UE and EPC, two states are defined, ECM (EPS Connection Management)-IDLE state and ECM-CONNECTED, which are applied to the UE and MME. When a UE on ECM-IDLE state establishes RRC connection with E-UTRAN, corresponding UE is in the state of ECM-CONNECTED. When MME in ECM-IDLE state establishes S1 connection with E-UTRAN, it is in the state of ECM-CONNECTED. When the UE is not in ECM-IDLE state, E-UTRAN does not have context information of the UE. Therefore, the UE in ECM-IDLE state performs the process related to mobility, e.g. cell selection or cell reselection, on its own base without requiring command from the network. When the UE is in ECM-CONNECTED state, however, the mobility of the UE is controlled by the command from the network. When the location of the UE in ECM-IDLE state is changed from what is known to the network, the UE notifies the network of its location through Tracking Area Update procedure.

Now, system information will be described.

System information includes basic information the UE should know for accessing the base station. Therefore, the UE should receive all the system information to access the base station, and have most recent system information. Since the system information is information that every UE in corresponding cell should know, the base station periodically transmits the system information.

According to section 5.2.2 of 3GPP TS 36.331 V8.7.0 (2009-09) "Radio Resource Control (RRC); Protocol specification (Release 8)", the system information is divided into MIB (Master Information Block), SB (Scheduling Block) and SIB (System Information Block). MIB enables the UE to recognize physical construction of corresponding cell such as bandwidth. SB informs transfer information of SIB such as transfer period. SIB is a set of relevant system information. For example, some SIBs only include information of neighboring cells, and other SIBs only include the information of uplink radio channel the UE uses.

Generally, services which network provides to a UE can be classified into three types as follows. The UE recognizes the cell type differently according to what services are provided. Types of services will be described first, and then types of cells.

1) Limited service: This service provides Emergency call and disaster warning system (Earthquake and Tsunami Warning System; ETWS), and can be provided from an acceptable cell.

2) Normal service: This service means a general common service (public use) which can be provided from a suitable or normal cell.

3) Operator service: This service means the service for communication network operators, which is available for communication network operators but not for general users.

Types of cell can be classified as follows in connection with the service types provided by the cell.

1) Acceptable cell: The cell from which the UE can receive limited service. The cell is not barred from the point of view of corresponding UE, and fulfills the condition of cell selection of the UE.

2) Suitable cell: The cell from which the UE can receive normal service. The cell fulfills the condition of acceptable cell and other additional conditions. As additional conditions, the cell should belong to PLMN (Public Land Mobile Network) that the corresponding UE can access, and tracking area update procedure of the UE shouldn't be barred. If the corresponding cell is a CSG cell, the cell should be the one that the UE can access the cell as a CSG member.

3) Barred cell: The cell which broadcasts the information of being a barred cell through system information.

4) Reserved cell: The cell which broadcasts the information of being a reserved cell through system information.

Now, measurement and measurement report will be described.

Support for mobility of UEs is essential in mobile communication system. Therefore, the UE continuously measures the quality of the serving cell which provides current service and the quality of neighboring cells. The UE reports the results of measurement to the network at an appropriate time, and the network provides the UE with optimal mobility through handover or other processes.

The UE can perform measurements of special purposes configured by the network and report the results of measurements to the network in order to provide information to help the operator manage the network in addition to the purpose of supporting mobility. For example, the UE first receives broadcast information of a certain cell specified by the network. Then the UE can report Cell Identity (otherwise referred to as global Cell Identity) of said cell, the cell's position identifying information (e.g. Tracking Area Code) and/or other cell information (e.g. information whether the cell is a member cell of CSG (Closed Subscriber Group)) to the serving cell.

When the UE in motion identifies that quality in specific area is very poor through measurement, the UE can report the information of the location of the cells with poor quality and the results of measurements to the network. The network can try optimization of the network based on the results of measurements from the UE that can help management of network.

In the mobile communication system with frequency reuse factor of 1, the mobility is made between different cells having almost same frequency bands. Therefore, in order to ensure mobility of the UE, the UE should be able to appropriately measure the quality and cell information of neighboring cells having the same central frequency as the central frequency of the serving cell. The measurement, as described above, which measures on the cell having the same central frequency as the central frequency of the serving cell is called intra-frequency measurement. The UE, by performing intra-frequency measurement, reports the results of measurement to the network so that the objectives of corresponding measurement results can be obtained.

The mobile communication operator can manage network by using multiple frequency bands. When the service of the system is provided by using multiple frequency bands, the UE, in order to be ensured the maximum mobility, should be able to appropriately measure the quality and cell information of neighboring cells having different central frequency from the central frequency of the serving cell. The measurement, as described above, which measures on the cell having different central frequency from the central frequency of the serving cell is called inter-frequency measurement. The UE should be able to perform inter-frequency measurement and report the results of measurement to the network at appropriate time.

If the UE supports a measurement on heterogeneous network, the base station can perform measurement on the cell of heterogeneous network through configuration. This measurement on heterogeneous network is called inter-RAT (Radio Access Technology) measurement. For example, RAT can include UTRAN (UMTS Terrestrial Radio Access Network) which complies with 3GPP standard specification, and GERAN (GSM EDGE Radio Access Network), and also include CDMA 2000 system which complies with 3GPP2 standard specification.

Figure 4:
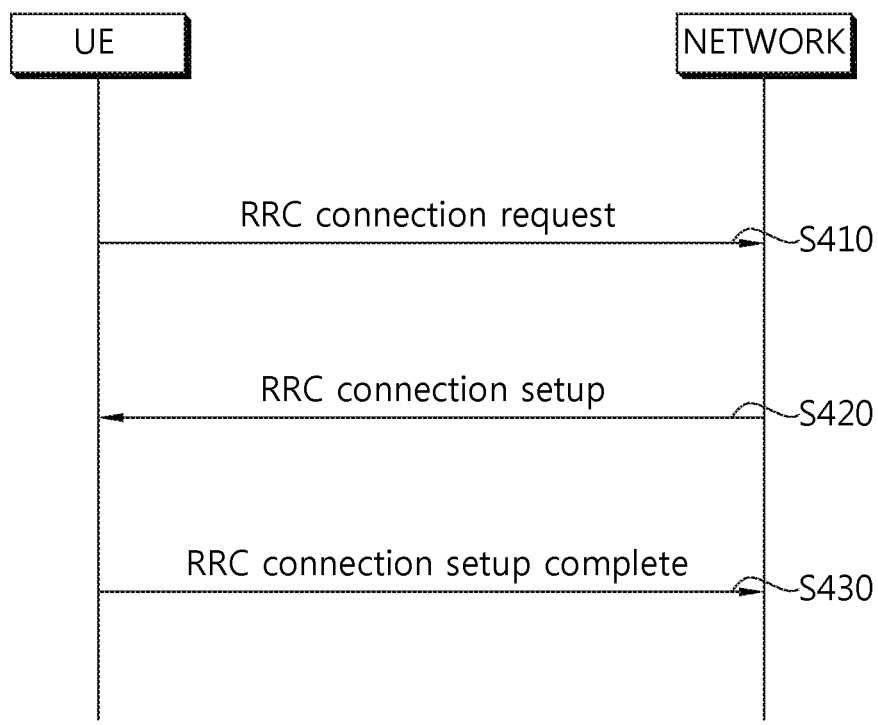
FIG. 4 is a flow diagram illustrating the process of RRC connection establishment.

FIG. 4 is a flow diagram illustrating the process of RRC connection establishment.

The UE sends RRC connection request message requesting RRC connection to network (S410). The network, in response to the RRC connection request, sends RRC connection setup message (S420). The UE, after receiving RRC connection setup message, enters RRC connection mode.

The UE sends RRC Connection Setup Complete message, which is used to confirm successful completion of RRC connection establishment, to the network (S430).

RRC connection re-establishment is performed in the similar way as that of RRC connection establishment. RRC connection re-establishment process re-establishes RRC connection, and related to restart of SRB1 operation, re-activation of security and reconfiguration of PCell (Primary Cell). The UE sends RRC Connection Reestablishment Request message, which requests RRC connection re-establishment, to network. The network, in response to the RRC connection re-establishment request, sends RRC connection re-establishment message. The UE, in response to RRC connection re-establishment, sends RRC connection re-establishment complete message.

Figure 5:
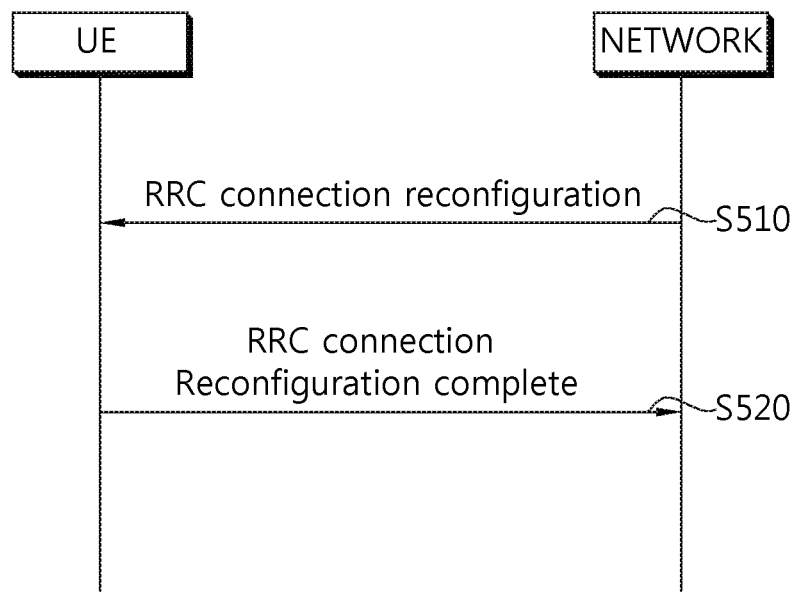
FIG. 5 is a flow diagram illustrating the process of RRC connection reconfiguration.

FIG. 5 is a flow diagram illustrating the process of RRC connection reconfiguration. RRC connection reconfiguration is used for modifying RRC connection. This is use for RB establishment/modify/release, carrying out handover, measurement setup/modify/release.

The network sends RRC Connection Reconfiguration message for modifying RRC connection to UE (S510). The UE, in response to the RRC connection reconfiguration, sends RRC Connection Reconfiguration Complete message to the network in order to confirm successful completion of RRC connection reconfiguration (S520).

Figure 6:
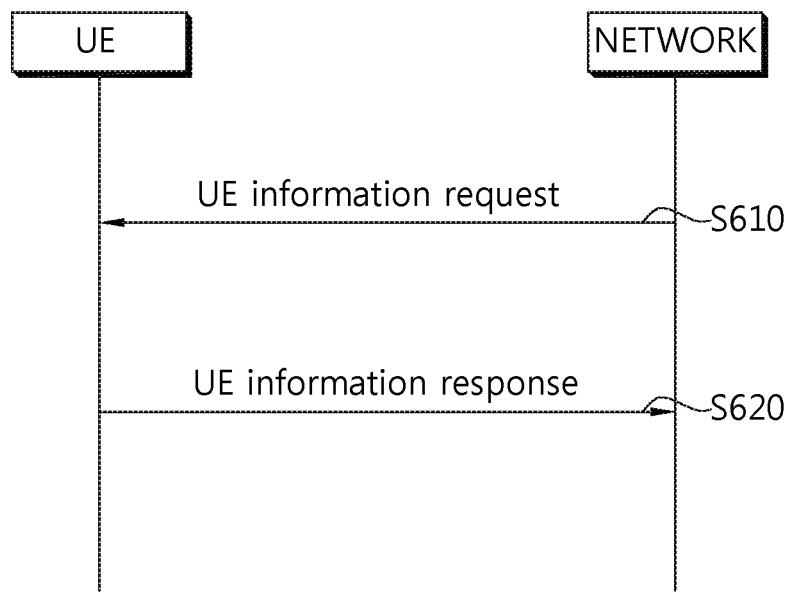
FIG. 6 is a flow diagram illustrating the process of reporting terminal information.

FIG. 6 is a flow diagram illustrating the process of reporting UE information.

The network sends UE Information Request message to the UE for acquiring the UE information (S610). The UE Information Request message includes the field indicating whether the UE should report the information on the random access procedure and/or radio link failure. The UE Information Request message includes the field instructing whether the UE should report logged measurement.

The UE, in response to the request for UE information, sends UE Information Response message including the information requested (S620).

Now, description will be made on MDT (Minimization of Driving Tests).

MDT is a method of test using UEs instead of vehicles which operators use for coverage optimization. The coverage varies depending on the location of the base station, arrangements of buildings around the test area and the environment of use of users. Therefore, the operator needs to perform driving tests periodically, requiring lots cost and resources. MDT enables the operator to measure the coverage by using UEs.

MDT can be divided into logged) MDT and immediate MDT. In logged MDT, the UE performs MDT measurement and transfers the logged measurement to network at certain point of time. In immediate MDT, the UE performs MDT measurement and transfers the measurement to network when reporting condition is fulfilled. Logged MDT performs MDT measurement in RRC idle mode while immediate MDT performs MDT measurement in RRC connection mode.

Figure 7:
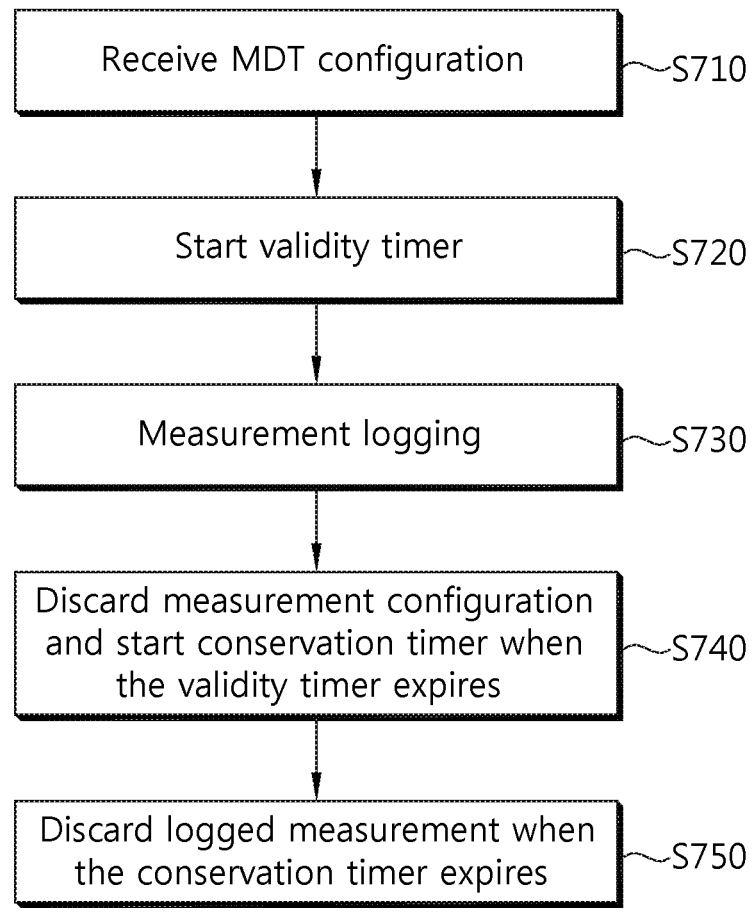
FIG. 7 illustrates the process of performing conventional MDT.

FIG. 7 illustrates the process of performing conventional MDT.

The UE receives MDT measurement configuration from the network (S710). The UE is in RRC connected mode in which RRC connection is established with the serving cell. Even when RRC mode is transited to RRC idle mode, MDT measurement configuration is maintained and so is the MDT measurement.

MDT measurement configuration can include at least one of logging interval, reference time and area configuration. Logging interval means an interval for storing the result of measurement. Reference time is used for being notified as the reference time when the UE sends logged measurement. Area configuration means the area where the UE is located to perform logging.

As the UE receives MDT measurement configuration, the UE starts validity timer (S720). The validity timer represents lifetime of MDT measurement configuration. The value of validity timer can be included in the MDT measurement configuration. The value is called logging duration. When the UE receives MDT measurement configuration, the UE sets the value of validity timer as logging duration, and starts validity timer.

The UE transits to RRC idle mode and carries out logging of the measurement based on the MDT measurement configuration while validity timer is in operation (S730). For example, MDT measurement can be carried out an every period of logging in MDT measurement configuration. The value of MDT measurement can be values which are well-known to those skilled in the art such as RSRP (Reference Signal Received Power), RSRQ (Reference Signal Received Quality), RSCP (received signal code power) and Ec/No.

Logging of MDT measurement by the UE based on MDT measurement configuration can vary depending on the position the UE locates.

Figure 8:
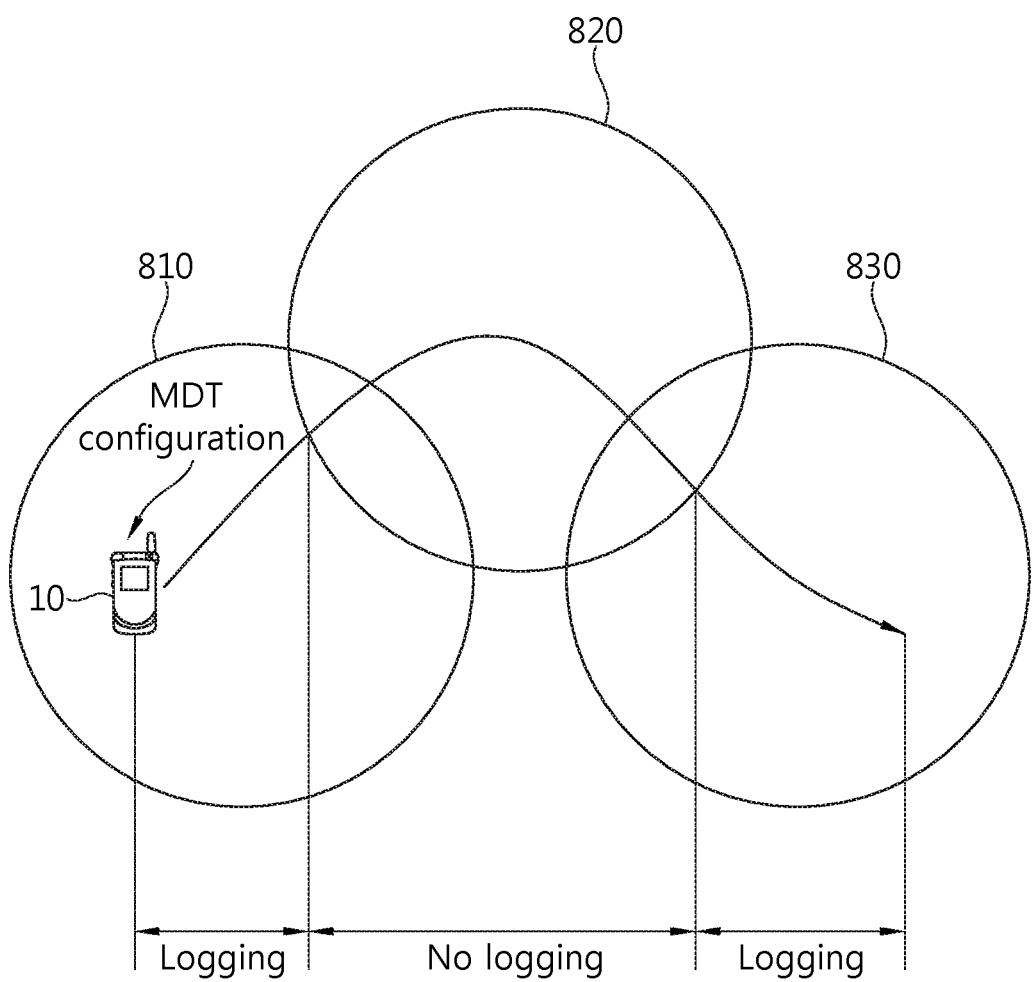
FIG. 8 illustrates one example of MDT measurements according to the logging area.

FIG. 8 illustrates one example of MDT measurements according to the logging area.

The network can configure the logging area where the UE should carry out logging. The logging area can be represented as a cell list or as tracking area/location area list. When logging area is configured to the UE, MDT measurement logging is suspended when the UE leaves the logging area.

The first area 810 and the third area 830 the area configured as the logging area, and the second area 820 is the area where logging is not allowed. The UE carries out logging in the first area 810 but does not carry out MDT measurement logging in the second area 820. When the UE moves from the second area 820 to the third area 830, logging of MDT measurement is carried out.

Figure 9:
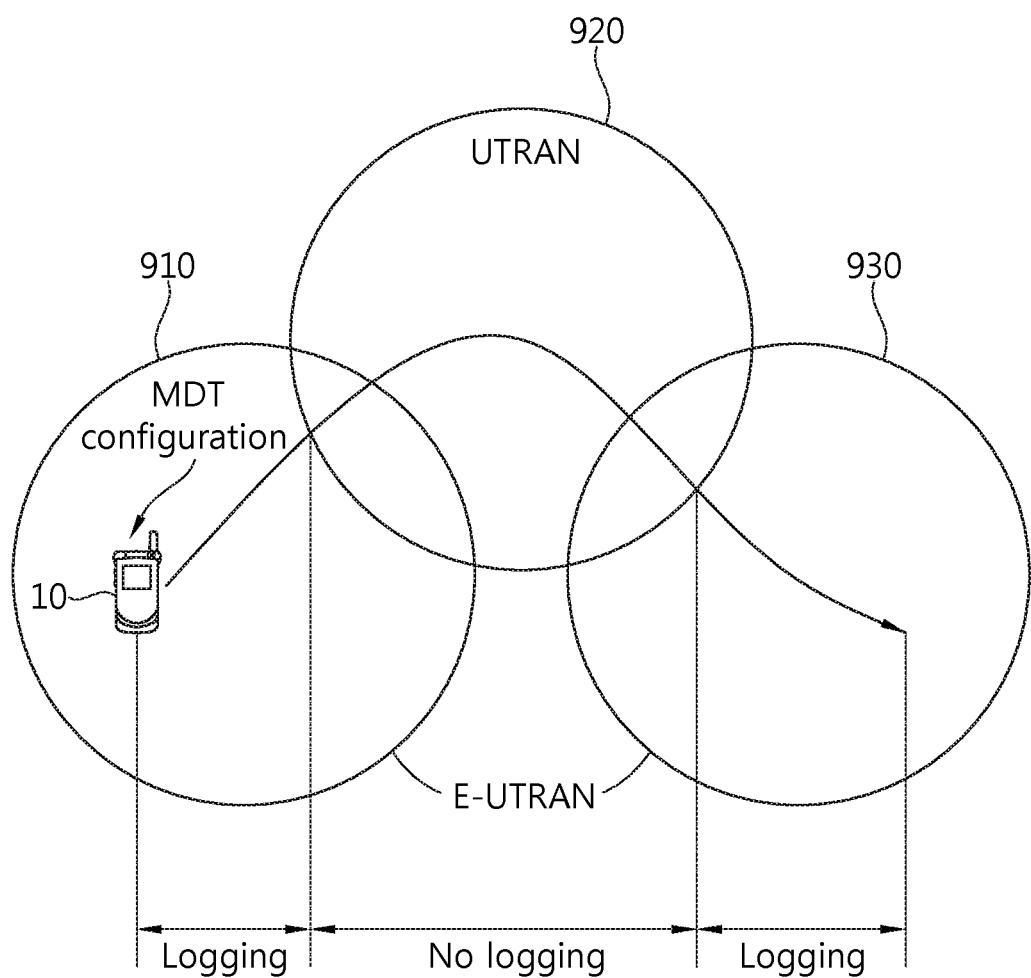
FIG. 9 illustrates one example of MDT measurements according to the change of RAT.

FIG. 9 illustrates one example of MDT measurements according to the change of RAT.

The UE performs logging only when it camps on the RAT which has received MDT measurement configuration, and stops logging on other RATs. However, the UE can perform logging of information of the cells in the RAT which is different from the RAT the UE camps on.

The first area 910 and the third area 930 are E-UTRAN areas, and the second area 920 is a UTRAN area. MDT measurement configuration is received from E-UTRAN. The UE does not perform MDT measurement as it enters the second area 920.

Referring to FIG. 7 again, the UE, when validity timer expires, discard the MDT measurement configuration, and starts conservation timer S740. The UE discards MDT measurement configuration and stops MDT measurement. However, logged measurement is maintained. The conservation timer represents the lifetime of logged measurement.

When conservation timer expires, logged measurement is discarded S750. When request for reporting logged measurement is received from the base station while conservation timer is in operation, the UE can report logged measurement.

The value of the conservation timer may be fixed. For example, the value of conservation timer may be 48 hours. Alternatively, conservation timer may be included in MDT measurement configuration, and notified by the base station to the UE.

When new MDT measurement configuration is received, the configuration is updated to the new MDT measurement configuration and validity timer restarts. Also, the logged MDT measurement according to previous configured MDT measurement configuration is discarded.

If logged MDT measurement exists, the UE can send availability of logged measurement to the base station when the mode is transited from RRC idle mode to RRC connection. The UE can send availability indicator to the network when RRC connection is established or RRC connection is re-established or RRC connection reconfigured. Also, the UE may include in the handover complete message the availability indicator that indicates logged MDT measurement exists in the cell for handover when handover is performed, and send to the network.

The network, when received the information indicating the existence of logged MDT measurement from the UE, may request transfer of logged MDT measurement to the UE. The network, knowing the existence of logged measurement, sends request of information requesting report of logged measurement to the UE. The UE, in response to the request, sends information including logged measurement to the network.

While MDT measurement is performed, the UE mainly measures the information on wireless environment. MDT measurement may include cell identifier, quality and/or intensity of signal of the cell. MDT measurement may include time and position of measurements.

Figure 10:
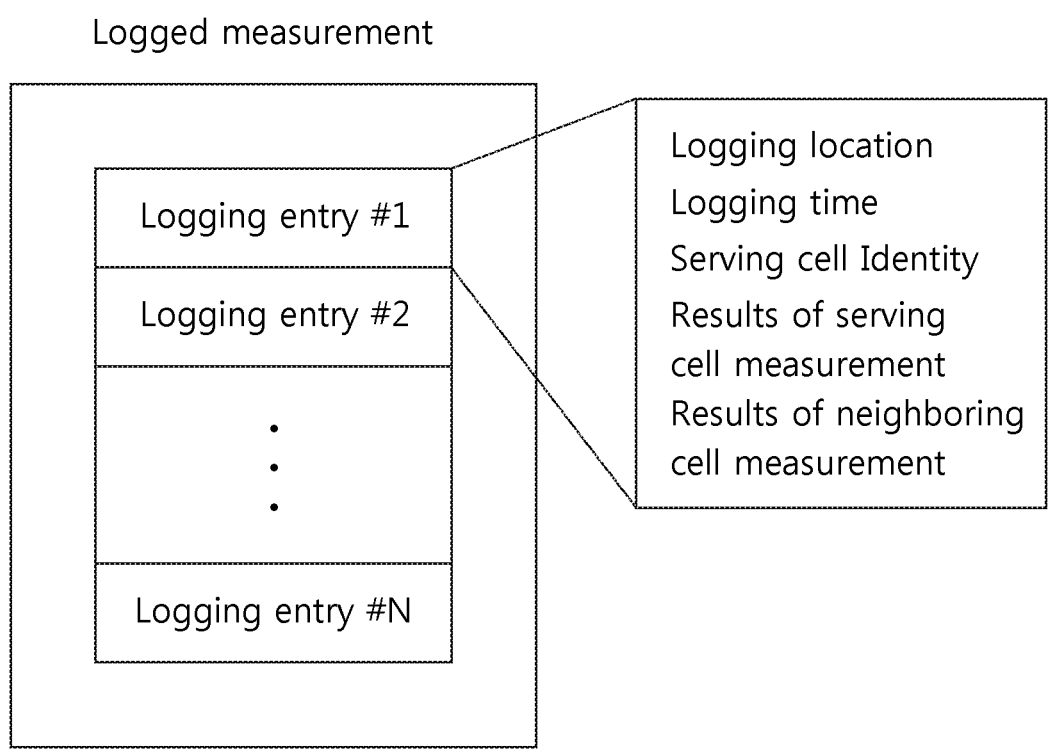
FIG. 10 illustrates one example of logged measurements.

FIG. 10 illustrates one example of logged measurements.

The logged measurement includes one or more of log entries.

The log entry includes logging location, logging time, serving cell identifier, results of measurement of the serving cell and results of measurement of neighboring cells.

Logging location represents the location where the UE carries out measurements. Logging time represents the time the UE carries out measurements. Each information of logging is stored at different log entry according to the logging time which can be different for each information.

Serving cell identity can include the cell identity of layer 3, which is referred to as GCI (Global Cell Identity). GCI is a set of PCI (Physical Cell Identity) and PLMN identity.

Loggings which are carried out by the UE can be suspended for various reasons even when the network instructed the UE to perform logging of the results of MDT measurement and/or the throughput indicators. For example, the logging of the UE can be suspended in the following situations even when the UE is configured to perform logging periodically.

When the network has configured the UE for the logging area (List of cells, or List of area codes—Tracking area codes) and the serving cell of the UE gets out of the logging area.

When the network configured the UE for logging PLMN list and rPLMN (registered PLMN) of the UE leaves this logging PLMN.

When the UE leaves RAT of the MDT configuration and is connected to other RAT.

When the UE gets out of the RRC state of available logging with respect to the logging configuration configured by the network (e.g., when the UE which has received Logged MDT measurement configuration leaves RRC_IDLE and is in state of RRC_ CONNECTED).

When the network configured the UE to perform logging only when specific conditions are met and those conditions are not met.

Generally, the UE maintains the configuration for logging even when the logging is suspended. When the UE gets out of the situation of suspended logging later, the UE resumes logging according to the maintained logging configuration. In this process, the results of logging from the time logging is stopped to the time logging is resumed are not included in the contents of the log of the corresponding UE. Also, the UE does not perform any logging at the time of stopping or resuming logging.

Figure 11:
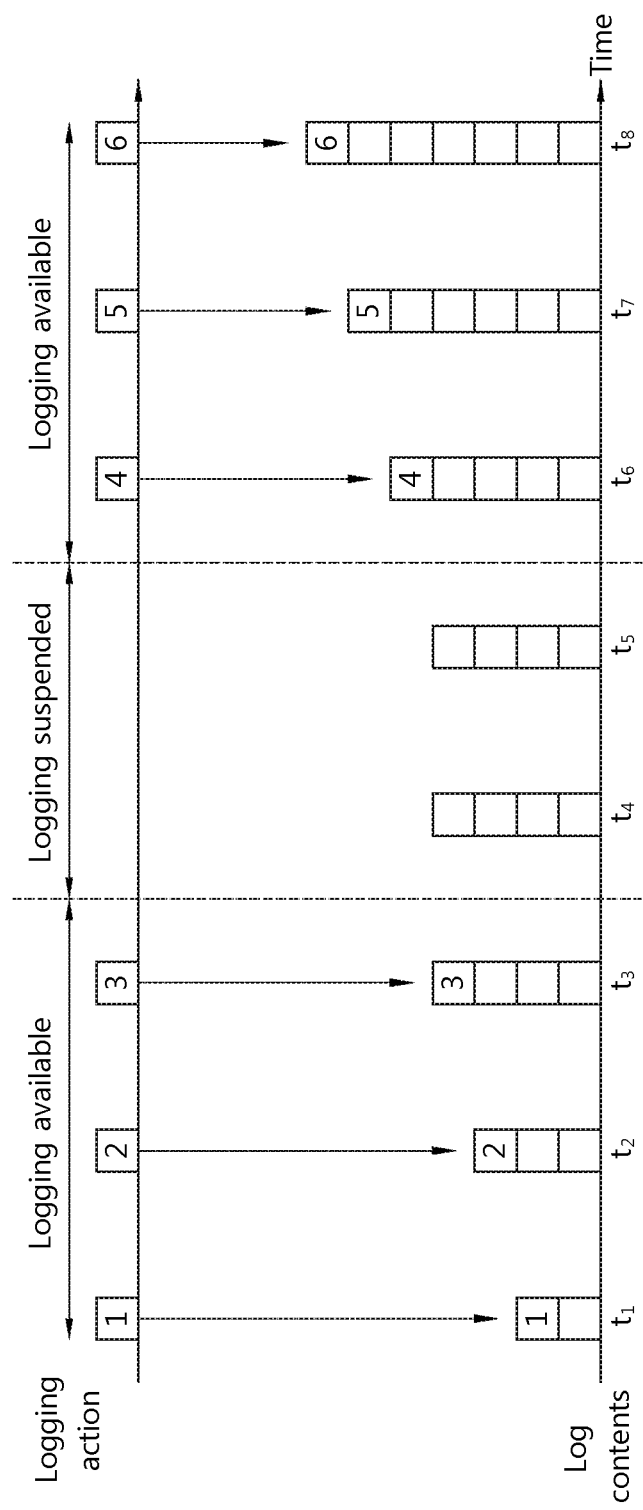
FIG. 11 illustrates one example of the contents of the log according to suspension and resumption of logging.

FIG. 11 illustrates one example of the contents of the log according to suspension and resumption of logging.

Referring to FIG. 11, the UE performs MDT measurement logging during $t_1$-$t_3$ interval when logging is allowed. The condition of suspending logging occurs between $t_3$ and $t_4$ and the UE stops logging. The UE does not perform logging between $t_4$ and $t_5$ which are logging time according to the logging interval. The condition of resuming logging occurs between $t_5$ and $t_6$ and the UE resumes logging. During the time between $t_6$ and $t_8$ and afterwards, the UE continuously performs MDT measurement logging.

During logging suspension and logging resumption, log contents show that there is no change of log at the time $t_4$ and $t_5$. In this way, the network that receives the log can determine that the results of logging is not continuous at the time $t_4$ and $t_5$.

When the network receives the log whose logging result is not continuous in time, i.e. the log data with partially empty parts of logging results, the network cannot know the wireless environment or throughput index experienced by the UE during the time when the result is empty. As a result, the network cannot acquire exact coverage map or other throughput indexes from the log received from the UE.

In order to solve the problem that can occur as described above, the embodiments of the present invention propose a method for logged measurement considering state transition of a UE, and the method supporting thereof. The specific methods of MDT measurement and logging described below can be applied to conventional MDT measurement method illustrated in FIG. 7.

Figure 12:
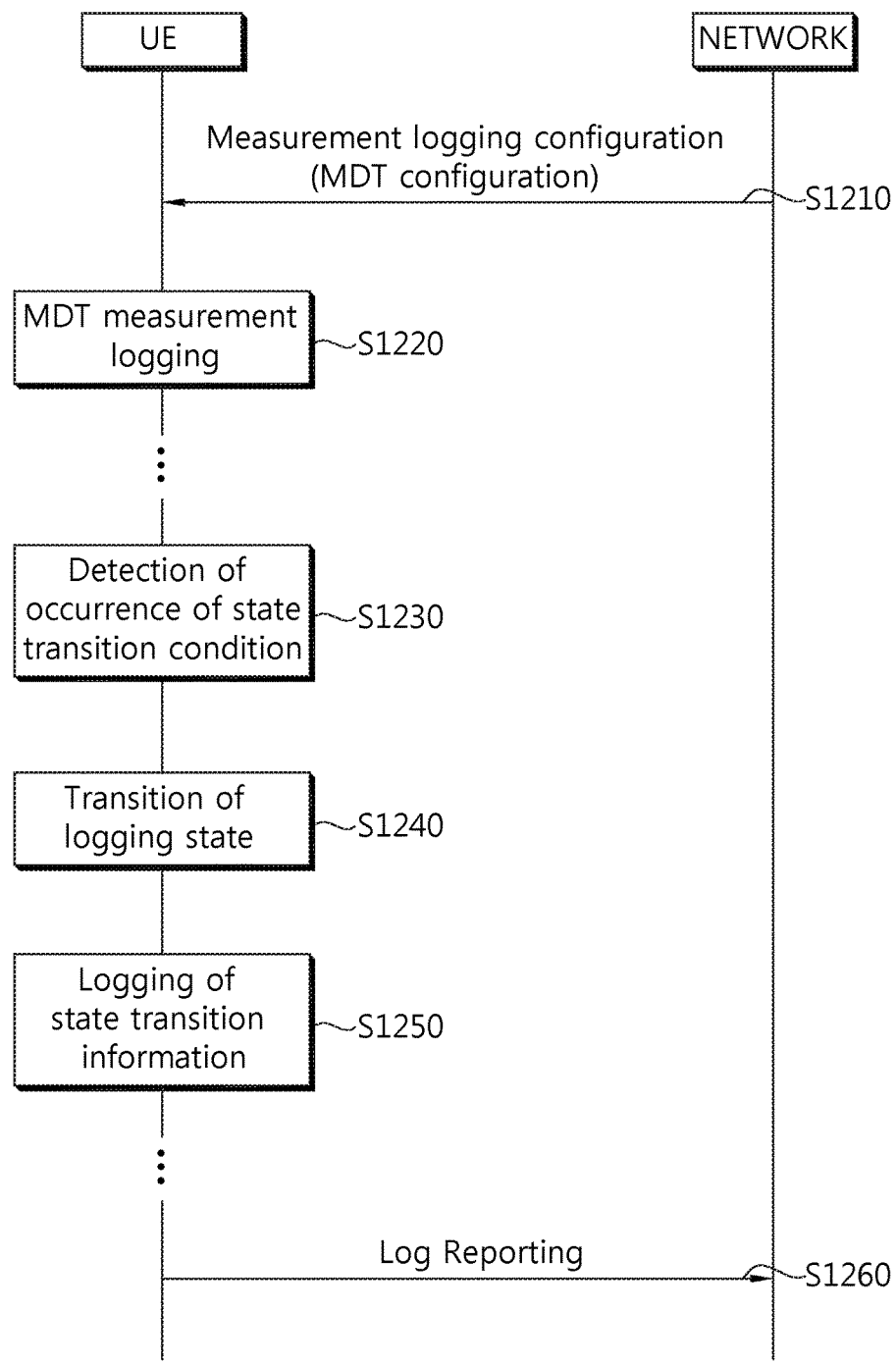
FIG. 12 illustrates the method for MDT measurement logging that can be applied to the embodiment of the present invention.

FIG. 12 illustrates the method for MDT measurement logging that can be applied to the embodiment of the present invention.

Referring to FIG. 12, the network instructs the UE to perform logging task by transferring measurement logging configuration to the UE (S1210). The measurement logging configuration transferred from the network to the UE may be MDT measurement configuration. The measurement logging configuration is assumed to be the MDT measurement configuration in the description below.

MDT measurement configuration includes information related to the conditions of state transition such as the conditions for suspension of logging or resumption of logging by the UE. The conditions of state transition transferred need not be always included in the MDT measurement configuration, but may be included in other messages the UE and the network exchange or may be the basic information parameter provided for the operation of the UE.

Upon receiving MDT measurement configuration, the UE enters the state of RRC_IDLE and stays in the state where logging is possible and performs MDT measurement logging based on the MDT measurement configuration (S1020).

The UE, when the condition of state transition is met, may operate by transiting between logging-enabled state and logging-suspended state (not illustrated).

The UE operating with specific logging state detects whether the condition of state transition has occurred (S1230). If the UE is operating in logging-enabled state, the UE detects whether the condition for suspending logging has occurred. If the UE is operating in logging-suspended state, the UE detects whether the condition for resuming logging has occurred.

The conditions of suspending the logging may be as follows.

When the UE gets out of the RRC state which is configured to perform logging. (e.g., the network configured logged MDT and the UE enters RRC_Connected state.)

When the UE leaves the RAT which is configured to perform logging and is connected to other RAT, (e.g., logged MDT measurement configuration is received but connection is made to UMTS in LTE.)

When the network configured the UE for logging area (List of cells or List of area codes—Tracking area codes) and the UE leaves said logging area.

When the UE leaves the RAT from which MDT measurement configuration was received and is connected to other RAT.

When the network configured the UE for logging PLMN list, and PLMN or rPLMN of the UE becomes not belonging to the logging PLMN list.

When the UE performing logged MDT is not camped in a suitable cell. i.e., the UE is not camped normally.

When total sum of the log information in the UE reaches a specific value.

Other cases such as the case where the network configured the UE to perform logging only when specific condition(s) is met and the does not meet the condition(s).

On the other hand, the conditions for resuming logging may be as follows.

The UE enters the RRC state which is configured to perform logging. For example, the UE enters RRC_IDLE state.

The UE enters the RAT state which is configured to perform logging. For example, the UE which received MDT measurement configuration from eNB enters from UMTS cell to E-UTRAN cell through cell reselection.

The UE enters the logging area.

The UE enters the logging PLMN.

The UE enters the state of normal camping.

Other cases where the UE meets all the conditions for performing logging.

When the UE detects that the condition for state transition has occurred, the UE transits to logging-enabled state or logging-suspended state according to the condition (S1240), and performs logging the information related to state transition (S1250). The operation of logging state transition of the UE and logging the state transition information will be described with reference to FIG. 13.

Figure 13:
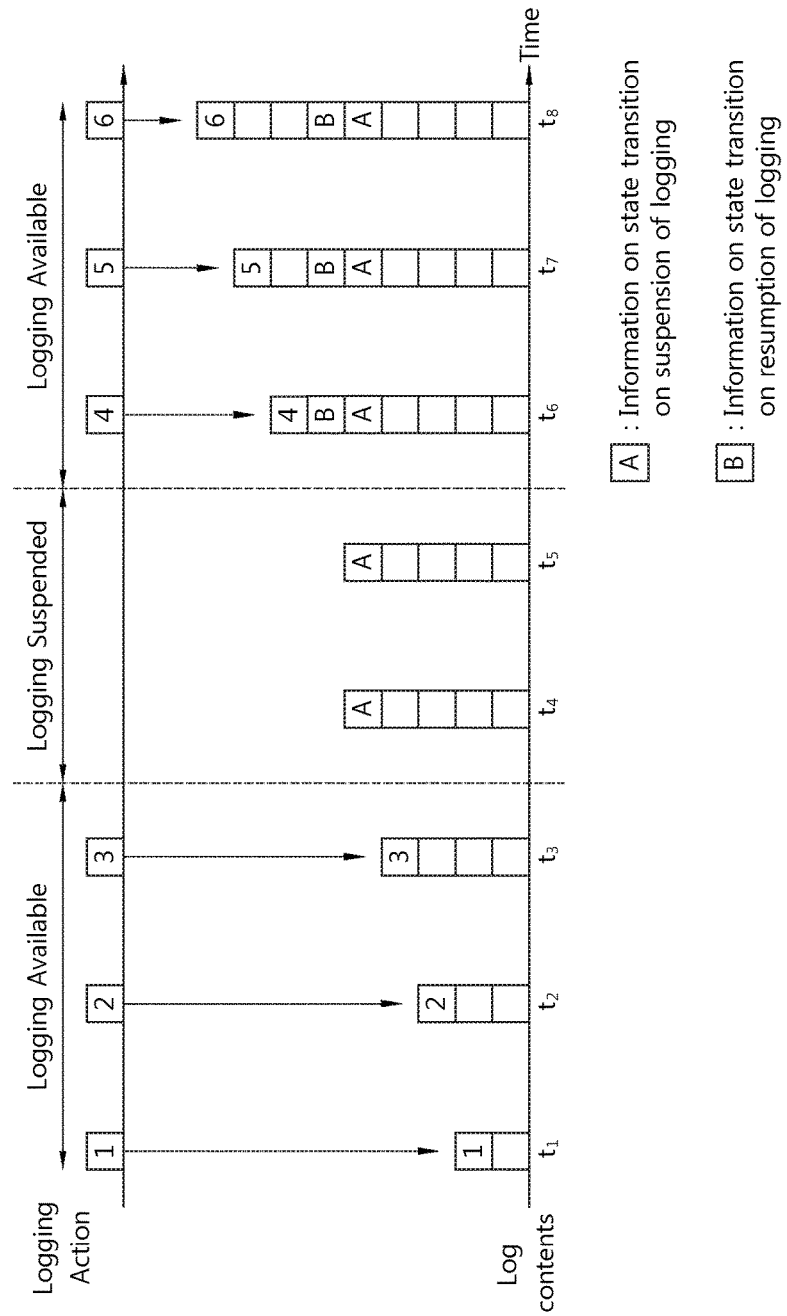
FIG. 13 illustrates one example of the contents of the log according to one embodiment of the present invention.

FIG. 13 illustrates one example of the contents of the log according to one embodiment of the present invention.

Assume that the UE operates in the state where logging is possible in interval between $t_1$ and $t_3$, and condition of suspending logging has occurred between $t_3$ and $t_4$. Also assume that condition for resuming logging has occurred between $t_5$ and $t_6$.

The UE performs MDT measurement logging in the interval between the times $t_1$ and $t_3$ in which logging is allowed. It can be seen that, in the interval $t_1$-$t_3$, the contents of log indicates that log entries including the MDT measurements measured in corresponding logging interval are stored continuously.

Since the condition of suspending logging occurs after the time $t_3$, the UE suspends logging. The UE, however, performs logging the information related to state transition. Referring to the contents of log at the time $t_4$, it can be seen that the information related to state transition of the UE is logged in the log contents along with the log entries previously logged. At this step, the information related to state transition may include the indicator representing the UE has entered the state of suspension of logging.

Since the condition for resuming logging occurs after the time $t_5$, the UE resumes logging. The UE performs logging of information related to state transition. Referring to the contents of log at the time $t_6$, it can be seen that additional information related to state transition and MDT measurement at the time $t_6$ are logged along with the log entries logged until the time $t_5$. At this step, the information related to state transition may include indicator representing the related UE has entered the state of resuming logging. Afterwards, the UE performs logging of each MDT measurement at the time $t_7$ and $t_8$.

The time the UE logs the information related to state transition may be the time of state transition or the time of logging scheduled according to the existing logging interval after state transition.

The information related to state transition may include the reason and time of state transition in addition to the indicator indicating the state transition of the UE. The reason of state transition of the UE may be at least one of the conditions of state transition detected by the UE at S1230.

According to the contents of the log illustrated in FIG. 13, the UE performs logging of state transition information both when the transition is made to logging suspension state or to logging-enabled state, which is just an illustration of the present invention. The UE may be configured to log the state transition information only when transition is made to logging suspension state or only when transition is made to logging-enabled state.

Referring to FIG. 12 again, the UE reports log to network (S1260). The process of reporting log to the network by the UE may include the process of transferring of log availability indicator to the network by the UE and transferring log to the network as a response to the request for reporting from the network.

When the network receives this log of recordings, network throughput information may be constructed such as coverage map by referring to relevant information contained in the log in connection with suspension of logging or resumption of logging.

Although the embodiments of the present invention described with reference to FIGS. 12-13 are explained based on the configured UE which performs logging periodically, the embodiments of the present invention may be applied to the configured UE which performs logging based on events.

Figure 14:
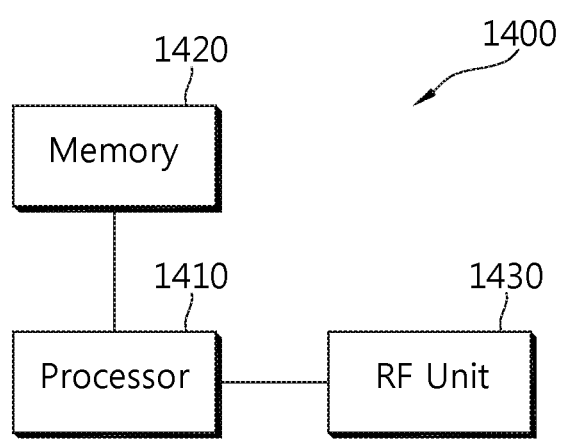
FIG. 14 is a block diagram illustrating a radio device in which one embodiment of the present invention is implemented.

FIG. 14 is a block diagram illustrating a radio device in which one embodiment of the present invention is implemented. The device implements the operation of UEs in the embodiments illustrated in FIGS. 7-13.

The radio device 1400 includes a processor 1410, memory 1420 and RF unit (radio frequency unit, 1430). The processor 1410 implements proposed functions, procedures and/or methods. The processor 1410 transits between RRC connection mode and RRC idle mode, and measures logged MDT based on the MDT measurement configuration. The processor 1410 detects state transition conditions, and performs transition to logging-enabled state or logging-suspended state based on the conditions of state transition. The processor 1410 can additionally perform logging of the state transition information according to the logging state transition. The memory 1420 is connected to the processor 1410, and stores the logging records including MDT measurement configuration, logged measurement and state transition information. The embodiments as described above in FIGS. 7-13 can be implemented by processor 1410 and memory 1420.

RF UNIT 1430 is connected to the processor 1410 for transmitting and receiving radio signals.

The processor can also include ASIC (application-specific integrated circuit), other chip sets, logic circuit and/or data processing unit. The memory can include ROM (read-only memory), RAM (random access memory), flash memory, memory card, storing media and/or other storing devices. The RF unit can include a base band circuit for processing radio signals. In the case where the embodiments are implemented by software, the methods described above can be implemented by modules (processes, functions, etc.). The module can be stored in the memory and executed by the processor. The memory can be present inside the processor, or present outside the processor and connected to the processor through well-known means.

Although the methods have been described as sequential steps or blocks based on flow diagrams in the illustrative system described above, the present invention is not limited to the orders of the steps and some steps can be carried out in different orders or simultaneously. Also, it can be easily appreciated by those skilled in the art that the steps illustrated in flow diagrams are note exclusive, and that other steps can be included or one or more steps can be removed without affecting the scope of the e present invention.

The invention claimed is:

1. A method for performing a measurement by a user equipment (UE) in a wireless communication system, the method comprising:
    receiving, by the UE, a measurement configuration from a network;
    performing, by the UE, a logging of measurement based on the measurement configuration;
    reporting, by the UE, a result of measurement logging to the network,
    wherein the result of measurement logging includes information related to a transition by the UE from a suspending logging to a resuming logging, and
    wherein the information indicates a time spent related to the transition.

2. The method of claim 1, wherein the information includes an indicator indicating that the transition has been made from the suspending logging to the resuming logging.

3. The method of claim 1, wherein the information includes a condition for the suspending logging.

4. The method of claim 3, wherein the condition for the suspending logging includes at least one of:
    leaving, of the UE, from a RRC (radio resource control) state, which is configured to perform the logging of measurement;
    leaving, of the UE, from a RAT (Radio Access Technology), which is configured to perform the logging of measurement;
    leaving, of the UE, from a logging area;
    leaving, of the UE, from a logging PLMN (Public Land Mobile Network); and
    leaving, of the UE, from a state of normal camping.

5. The method of claim 1, wherein the measurement configuration is a Minimization of Driving Tests (MDT) measurement configuration.

6. The method of claim 1, wherein the information indicates a time duration from a moment of radio link failure to a moment of a completion for a radio link connection.

7. The method of claim 1, wherein the information includes a condition for the resuming logging.

8. The method of claim 7, wherein the condition for the resuming logging includes at least one of:
    entering, of the UE, to a RRC (radio resource control), which is configured to perform the logging of measurement;
    entering, of the UE, to a RAT (Radio Access Technology), which is configured to perform the logging of measurement;
    entering, of the UE, to a logging area;
    entering, of the UE, to a logging PLMN (Public Land Mobile Network); and
    entering, of the UE, to a state of normal camping.

9. The method of claim 1, wherein the logging of measurement is periodically performed by the UE.

10. An apparatus for performing a measurement in a wireless communication system, the apparatus comprising:
    a Radio Frequency (RF) unit for receiving and transmitting a radio signal; and
    a processor connected to the RF unit, the processor configured to:
        receive a measurement configuration from a network;
        perform a logging of measurement based on the measurement configuration; and
        report a result of measurement logging to the network,
        wherein the result of measurement logging includes information related to a transition from a suspending logging to a resuming logging, and
        wherein the information indicates a time spent related to the transition.

11. The apparatus of claim 10, wherein the information includes an indicator indicating that the transition has been made from the suspending logging to the resuming logging.

12. The apparatus of claim 10, wherein the information includes a condition for the suspending logging.

13. The apparatus of claim 12, wherein the condition for the suspending logging includes at least one of:
    leaving, of the UE, from a RRC (radio resource control) state, which is configured to perform the logging of measurement;
    leaving, of the UE, from a RAT (Radio Access Technology), which is configured to perform the logging of measurement;
    leaving, of the UE, from a logging area;
    leaving, of the UE, from a logging PLMN (Public Land Mobile Network); and
    leaving, of the UE, from a state of normal camping.

14. The apparatus of claim 10, wherein the measurement configuration is a Minimization of Driving Tests (MDT) measurement configuration.

15. The apparatus of claim 10, wherein the information indicates a time duration from a moment of radio link failure to a moment of a completion for a radio link connection.

16. The apparatus of claim 10, wherein the information includes a condition for the resuming logging.

17. The apparatus of claim 16, wherein the condition for the resuming logging includes at least one of:
    entering, of the UE, to a RRC (radio resource control), which is configured to perform the logging of measurement;
    entering, of the UE, to a RAT (Radio Access Technology), which is configured to perform the logging of measurement;
    entering, of the UE, to a logging area;
    entering, of the UE, to a logging PLMN (Public Land Mobile Network); and
    entering, of the UE, to a state of normal camping.

18. The apparatus of claim 10, wherein the processor is further configured to periodically perform the logging of measurement.

* * * * *